United States Patent [19]

Minoura et al.

[11] 4,312,588
[45] Jan. 26, 1982

[54] HIGH-SPEED RECORDING APPARATUS

[75] Inventors: Kazuo Minoura; Kazuhiro Hirayama, both of Yokohama, Japan

[73] Assignee: Canon Kabushiki Kaisha, Tokyo, Japan

[21] Appl. No.: 111,974

[22] Filed: Jan. 14, 1980

[30] Foreign Application Priority Data

Jan. 20, 1979 [JP] Japan .................... 54-5812

[51] Int. Cl.³ .................... G03G 15/28; G03B 27/54
[52] U.S. Cl. .................... 355/8; 355/3 R; 355/67; 350/6.6
[58] Field of Search .................... 355/3 R, 8, 35, 67; 350/6.6; 33/DIG. 21

[56] References Cited

U.S. PATENT DOCUMENTS

| 3,970,359 | 7/1976 | Starkweather | 355/8 X |
|---|---|---|---|
| 4,070,089 | 1/1978 | Grafton | 355/8 X |
| 4,167,324 | 9/1979 | Wu | 355/3 R |
| 4,169,275 | 9/1979 | Gunning | 355/8 X |
| 4,188,113 | 2/1980 | Hiraga | 355/8 X |
| 4,204,725 | 5/1980 | DiStephano et al. | 355/3 R |
| 4,213,146 | 7/1980 | Maiman | 350/6.6 X |
| 4,232,964 | 11/1980 | Nodov et al. | 355/8 X |
| 4,251,126 | 2/1981 | Minoura et al. | 350/6.6 |

FOREIGN PATENT DOCUMENTS 106239 8/1979 Japan .................... 355/8

*Primary Examiner*—Gene Z. Rubinson
*Assistant Examiner*—Richard M. Moose
*Attorney, Agent, or Firm*—Fitzpatrick, Cella, Harper & Scinto

[57] ABSTRACT

The present invention provides a laser scanning apparatus for modulating a laser beam with a modulator into plural independent modulated beams and scanning a plane with the plural beams. In order to prevent a change of the intensity of each beam spot on the scanned plane depending on the exit angle of the beam from the laser, there is provided a converging lens of a focal length f1 between the laser and modulator in such a manner, when the distance from the beam exit of the laser to the converging lens is selected equal to $f1 + \Delta S$ and the distance from the lens to the modulating point of the modulator is selected approximately equal to f1, as to satisfy the following relation:

$$|\Delta S| < \pi \cdot Bi_2/4\lambda$$

wherein Bi is the diameter of the laser beam and $\lambda$ is the wave-length of said laser beam.

5 Claims, 8 Drawing Figures

HIGH-SPEED RECORDING APPARATUS

BACKGROUND OF THE INVENTION

The present invention relates to a high-speed recording apparatus in which a laser beam is modulated into plural independent modulated beams.

In a laser beam recording apparatus utilizing an acousto-optical modulator, a high-speed recording can be achieved by converting a single beam from a light source into plural independent beams by simultaneously applying ultrasonic waves of plural frequencies to the acousto-optical element and scanning a recording medium simultaneously with said plural beams modulated independently.

In a scanning system for single beam scanning by applying an ultrasonic wave of a single frequency to the acousto-optical element, the primary diffraction intensity is maximized when the incident beam angle to the acousto-optical element is so selected that the primary diffraction light satifies the optimum Bragg angle.

In constrast to the above-mentioned case with a single frequency wherein the beam incident angle to the acousto-optical element can be determined so as to maximize the primary diffraction intensity, the incident angle in case of plural frequencies is determined in the following manner.

FIG. 1 shows the change of the primary diffraction intensity as a function of incident angle $\theta$, in case the acousto-optical element receives two different frequencies.

The curves A and B respectively correspond to the frequencies $\nu A$ and $\nu B$, having respective maximum points. Consequently, if the incident angle is selected corresponding to the maximum value of either one curve, the diffraction intensity for the other curve becomes inevitably lower. The two beams having such unbalanced diffraction intensities will provide different energy densities on the recording medium, thus giving rise to a difference in the density or in the spot diameter. In order to prevent such difference the incident angle is selected at $\theta_o$, shown in FIG. 1, corresponding to the crossing point of said curves A and B, whereby the diffraction intensities corresponding to two frequencies are selected mutually equal, thus giving equal recording densities or spot diameters.

As the above-mentioned incident beam angle $\theta_o$ selected to obtain equal intensities in the diffracted beams does not correspond to the maximum diffraction intensity for each frequency, an eventual aberration of the actual incident angle from said selected angle $\theta_o$ will result in a difference among the diffraction intensities, leading to a difference in the recording density or in the spot diameter as explained in the foregoing.

An example of the scanning apparatus utilizing an acousto-optical element as the modulator and performing the scanning with plural independent beams is disclosed in Japanese Patent Laid-Open Sho53-101228, the optical system of which, from the laser to the modulator, is schematically there is shown in FIG. 2, wherein shown a laser 1, lenses 2, 3 for compressing the beam diameter, and an acousto-optical modulator 4. The beam compressing lenses 2 and 3 constitute an afocal lens system for reducing the diameter Bi of the incident laser beam from the laser 1 to an emergent beam diameter Bo. In response to a change of the laser beam angle from the laser by $\Delta\theta_i$, the beam emerging from the beam compressor and entering the acousto-optical modulator shows an angular change:

$$\Delta\theta_o = Bi/Bo \times \Delta\theta_i \tag{1}$$

Thus, in such optical system as explained in the foregoing, the angular change $\Delta\theta_i$ in the beam emerging from the laser is amplified by Bi/Bo in the angular change $\Delta\theta_o$ of the beam entering the acousto-optical modulator.

SUMMARY OF THE INVENTION

The object of the present invention is to provide a high-speed scanning apparatus which avoids variations in the recording density or in the recording spots even when the emerging beam angle of the laser is changed by a change in the circumferential temperature or by vibration.

According to the present invention, the above-mentioned object is achieved by maintaining a substantially constant incident beam angle to the modulator even when the emerging beam angle from the laser is changed. More specifically, in the high-speed scanning apparatus of the present invention, there is provided a converging lens of focal length f1 between the laser and the multiplex modulator in such a manner, when the distance from the beam exit of said laser to said converging lens is selected equal to f1+$\Delta$S and the distance from said lens to the beam modulating point of said multiplex modulator is selected approximately equal to f1, as to satisfy the following relation:

$$|\Delta S| < \pi \cdot Bi^2/4\lambda$$

wherein Bi is the diameter of the laser beam entering the converging lens and $\lambda$ is the wavelength of said laser beam.

Furthermore, in a preferred embodiment of the present invention, the above-mentioned $\Delta$S is selected equal to zero, while said converging lens constitutes a telecentric system having the pupil at the beam exit of said laser.

DESCRIPTION OF THE PREFERRED EMBODIMENT

Figure 3:
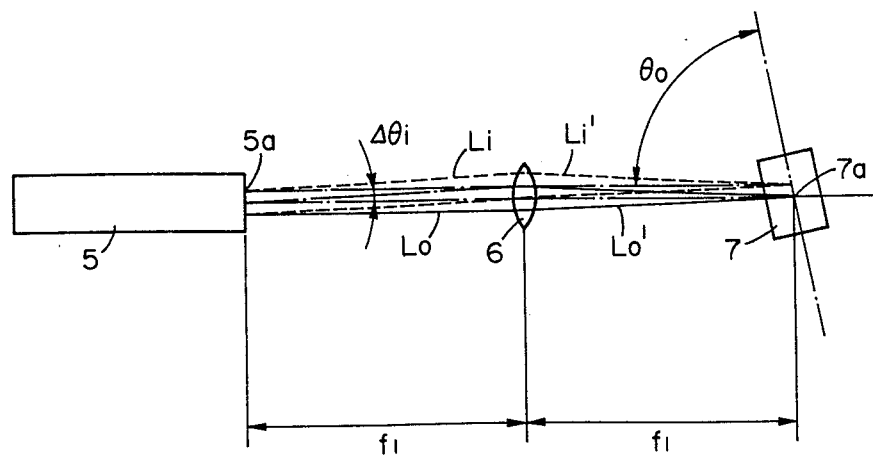
FIG. 3 is a schematic view showing the principle of the high-speed scanning apparatus embodying the present invention.

In the scanning apparatus of the present invention, as schematically shown from the light source to the modulator in FIG. 3, a laser 5, a lens 6 and an acousto-optical modulator 7 are arranged in such a manner that the distance from the beam exit 5a of said laser 5 to the converging lens and the distance from the optimum deflecting point 7a of said modulator 7 to said lens 6 are both equal to the focal length f1 thereof.

In such arrangement, in case the emerging beam from the laser 5 is shifted from the normal position Lo by an angle $\Delta\theta i$ to the position Li, the resulting incident beam Li' to the modulator 7 is displaced, in comparison with the normal incident beam Lo', by an amount $f \cdot \Delta\theta i$ in a direction perpendicular to the optical axis of the lens 6, but the incident angle of said beam Li' with respect to the acousto-optical modulator 7 is the same as that of the beam Lo' with respect to the modulator 7.

The above-mentioned optical system constitutes a so-called telecentric system having the pupil at the beam exit of the laser whereby the principal ray of the beam being parallel to the optical axis after emerging from the lens 6, so that the direction of the beam emerging from the lens 6 remains unchanged even when the incident beam angle to the lens 6 is changed.

In practice, however, it is not necessary to have such complete telecentric system as will be clarified in the following description.

Figure 4:
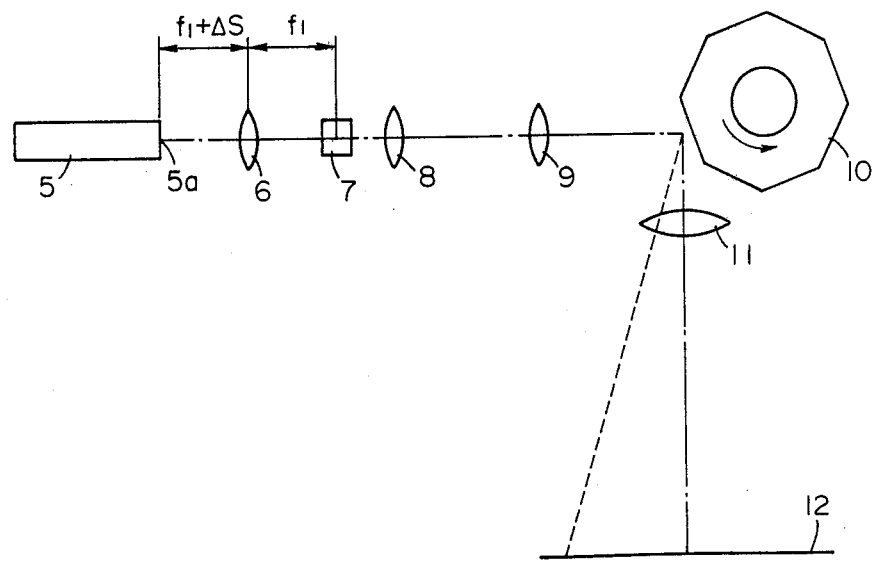
FIG. 4 is a schematic view of an embodiment of the present invention.

FIG. 4 illustrates a recording apparatus utilizing the scanning apparatus of the present invention, wherein there are shown a laser 5, a converging lens 6 of a focal length f1, an acousto-optical modulator 7 capable of generating plural primary diffraction lights in response to ultrasonic waves of plural frequencies, a converging lens 8 of a focal length f2, a converging lens 9 of a focal length f3, a rotary deflecting mirror 10, an imaging lens 11 of a focal length f4, and a photosensitive medium 12.

In the arrangement shown in FIG. 4, the distance from the beam exit 5a of the laser to the lens 6 is assumed as $f1 + \Delta S$, while the distance from said lens 6 to the modulator 7 is selected equal to f1, wherein said distances being measured from the principal point of the lens.

In such arrangement, in case the beam from the exit 5a, which is distanced by $f1 + \Delta S$ from the lens 6, is inclined by an angle $\Delta\theta i$, the incident beam angle $\Delta\theta_o$ to the modulator 7 is represented by:

$$\Delta\theta o = \Delta S \cdot \Delta\theta i / f1 \qquad (2)$$

When $\Delta S = 0$, the above-explained system is reduced to the telecentric system shown in FIG. 3 wherein $\Delta\theta o$ is constantly equal to zero.

Figure 1:
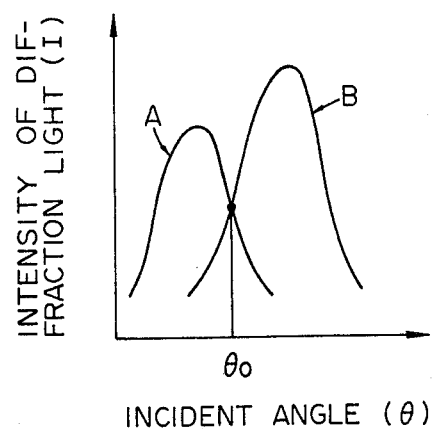
FIG. 1 is a chart showing an example of beam intensities modulated by a multiplex modulator.
Figure 2:
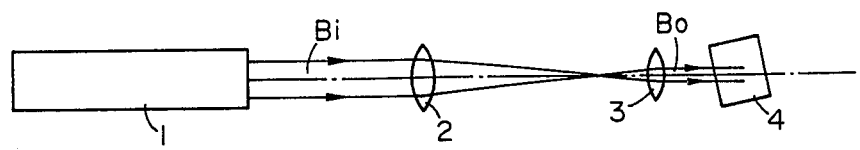
FIG. 2 is a schematic view showing an example of a conventional high-speed scanning apparatus.
Figure 5:
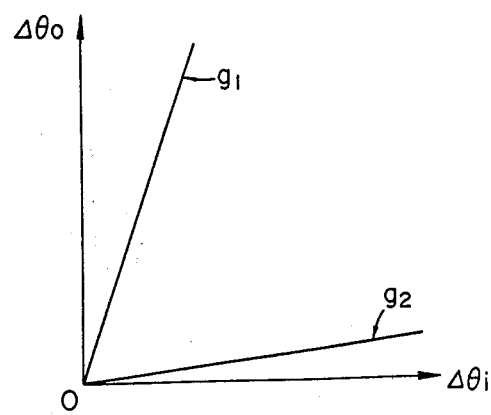
FIG. 5 is a chart showing the comparison of the apparatus of the present invention with a conventional apparatus.

FIG. 5 shows the effect of the present invention, wherein the line $g_1$ represents the case of using a beam compressor between the laser and the modulator as shown in FIG. 2 corresponding to the relation (1), while the line $g_2$ represents the case of using a converging lens 6 as shown in FIG. 4 corresponding to the relation (2).

In FIG. 5 there is shown the change $\Delta\theta o$ in the incident beam angle to the modulator 7 in the ordinate as a function of the change $\Delta\theta i$ in the emergent beam angle from the laser. If the amount $\Delta S$ is selected to satisfy the following relation:

$$|\Delta S| < (Bi/Bo) \cdot f1 \qquad (3)$$

the system of the present invention is advantageous as the value $\Delta\theta_o$ according to the present invention is smaller than that obtainable with the beam compressor.

In general, in comparison with the change $\Delta\theta_o$ of incident beam angle to the acousto-optical modulator said change in the present invention can be made smaller by a factor $(Bi/Bo)/(\Delta S/f1)$, wherein Bi is the beam diameter emerging from the laser while Bo is the spot diameter at the optimum deflecting point in the acousto-optical modulator in the present invention.

The optimum value of said spot diameter Bo is determined in response to the frequency of the ultrasonic wave to be applied to said modulator.

Also the optimum value of the focal length f1 of the lens 6 is determined according to the following equation:

$$f1 = \pi/4\lambda \cdot Bi \cdot Bo \qquad (4)$$

By substituting this equation (4) into the equation (3) there is obtained:

$$|\Delta S| < \pi/4\lambda \cdot B_i^2 \qquad (5)$$

wherein $\lambda$ is the wavelength of the laser beam.

Figure 6:
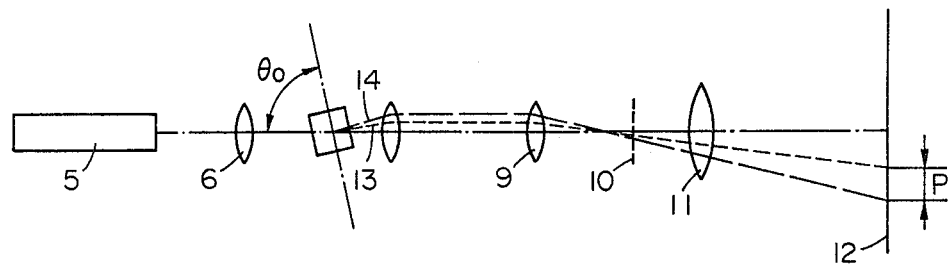
FIG. 6 is a developed view of the apparatus of FIG. 4 shown in a cross-section orthogonal thereto.

FIG. 6 is a developed view of the optical system of FIG. 4 shown in a cross-section perpendicular thereto, wherein shown is the separation of two beams by a pitch P on the photosensitive medium in response to two ultrasonic frequencies applied to the acousto-optical modulator.

When two ultrasonic frequencies are applied to the modulator with the propagating direction of said ultrasonic waves at an angle $\theta o$ to the optical axis of the optical system, there are generated two primary diffraction beams 13, 14 separated by an angle $\theta_o'$, which provides focused spots, on the photosensitive medium, separated by a distance P defined by the following equation:

$$\Delta P = \beta \cdot f2 \cdot \Delta\theta_o' \qquad (6)$$

wherein $\beta$ is the synthesized imaging magnification of the system composed of the converging lens 9 and imaging lens 10 by which the focal point of the converging lens 8 and the photosensitive medium 12 are maintained mutually conjugate. In case the lens 8 and lens 9 constitute an afocal system (called the beam relay lens system), said value $\beta$ is defined by f4/f3.

In the following there will be given a numerical example of the scanning apparatus embodying the present invention.

In case of using a He-Ne laser with a wavelength $\lambda = 6328$ Å, with an emerging beam diameter $(1/e^2)$ Bi of 1.2 mm and with a spot diameter of $(1/e^2)$ Bo of 0.15 mm in the modulator, the optimum focal length f1 of the lens 6 is determined as 223.4 mm from the relation (4), so that $|\Delta S|$ should be smaller than 1787 mm according to the relation (5).

Tab. 1 shows the relative intensities of diffracted beams 13, 14 in response to an aberration $\Delta\theta_o$ in the incident beam angle to the modulator:

TABLE 1

| Aberration | $\Delta\theta_o$ | −1 mrad | 0 | 1 mrad |
|---|---|---|---|---|
| Relative | Beam 13 | 1.06 | 1 | 0.82 |
| intensity | Beam 14 | 0.66 | 1 | 1.32 |

The above-mentioned fluctuation in the diffraction intensities results in a fluctuation in the amount of light exposed to the photosensitive medium, appearing as a change in the image intensity or in the spot size.

As explained in the foregoing, if the distance between the laser 5 and the lens 6 is selected to satisfy the condition $|\Delta S| < 1787$ mm, the diffraction intensities of the acousto-optical modulator are superior to those obtainable with the conventional beam compressor.

Figure 7:
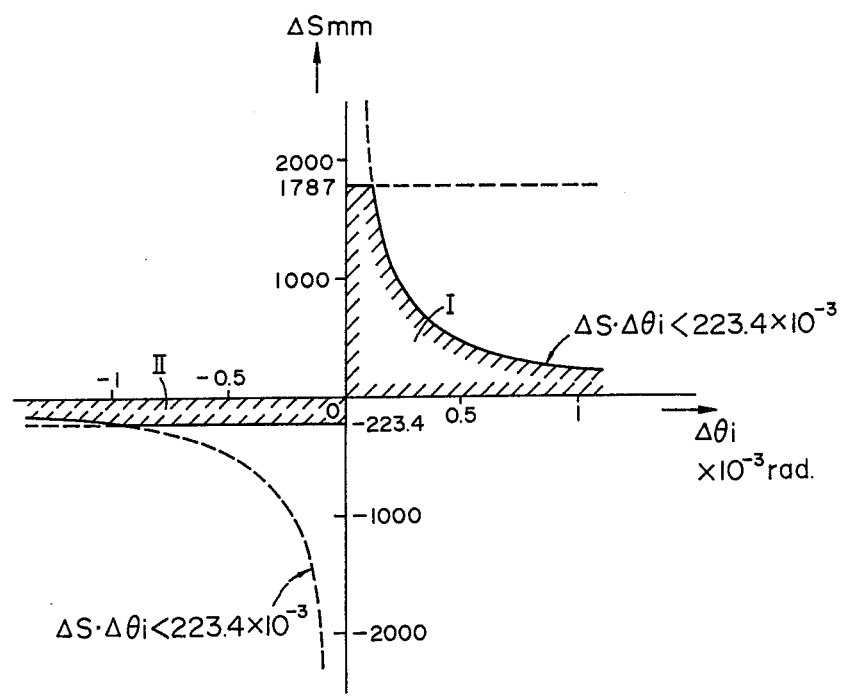
FIG. 7 is a chart showing the relation between $\Delta$S and $\theta i$ in an embodiment of the present invention.

However, in the foregoing example, the change in the diffraction intensity is limited by the values shown in Tab. 1. Thus, inserting $f1 = 223.4$ mm and $\Delta \theta_o \times 10^{-3}$ rad. into the relation (2) there is obtained:

$$\Delta S \cdot \Delta \theta i < 223.4 \times 10^{-3} \text{ mm. rad.} \quad (7)$$

as graphically represented in FIG. 7.

Also, as already explained, the condition for being superior to the conventional beam compressor is:

$$\Delta S < 1787 \text{ mm.} \quad (8)$$

Further, as the distance from the beam exit of the laser to the lens 6 must be positive, there should be satisfied:

$$\Delta S > -f1 = -223.4 \quad (9)$$

The relations (7), (8) and (9) are satisfied in the hatched areas in FIG. 7.

Figure 8:
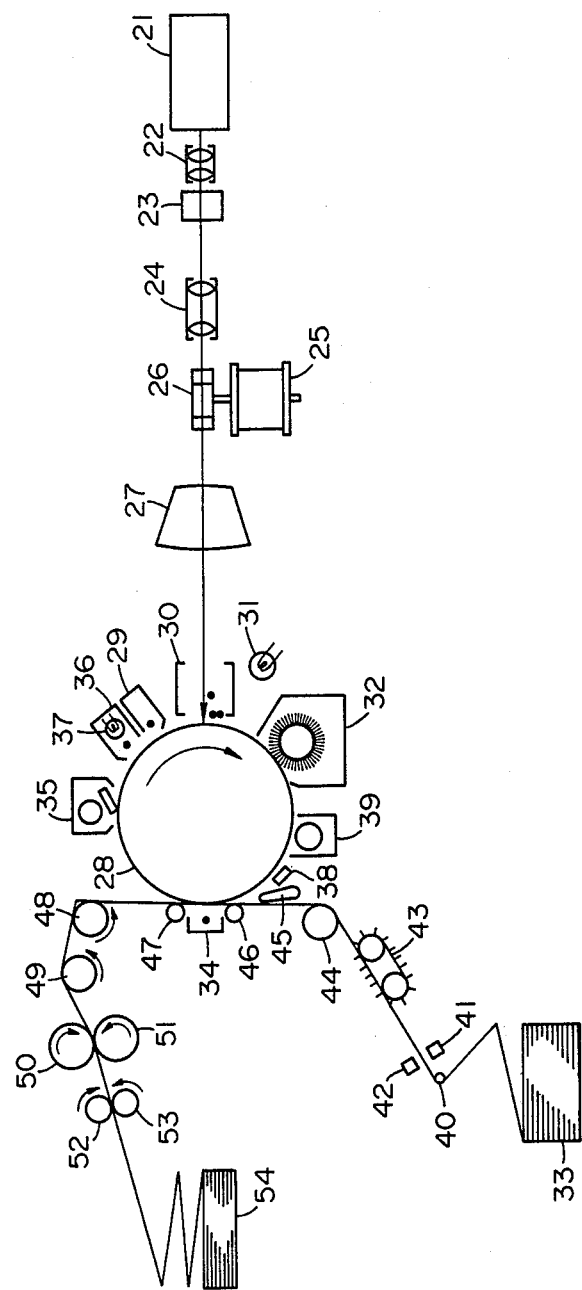
FIG. 8 is a view of a laser beam printer employing the apparatus of the present invention.

FIG. 8 schematically shows the basic structure of a computer output printer utilizing the high-speed scanning apparatus of the present invention. In said apparatus the laser beam emitted by a laser 21 is introduced through a converging lens system 22 as explained in the foregoing to a multiplex acousto-optical modulator 23, which performs beam modulation in response to signals received from an unrepresented computer. The plural modulated beams emerging from said modulator 23 are expanded by an afocal optical system 24 and enter a rotary polygonal mirror 26 having one or plural mirror faces and rotated by a drive mechanism 25. Said beams, put into horizontal sweeping motion by said rotary polygonal mirror 26, are focused as spots on a photosensitive drum 28 through an imaging lens 27 of $f-\theta$ characteristic. In an ordinary imaging lens, the image position r on the image plane is related to the incident angle $\theta$ of the light by an equation $r = f \cdot \theta$ wherein f is the focal length of said lens. Consequently, when the incident angle to the imaging lens 27 is changed linearly in time by the constant-speed rotation of the mirror 26 as in the present embodiment, the displacing speed of the focused spot on the photosensitive drum constituting the image plane is not constant but shows a non-linear change, thus giving a higher displacing speed as the incident angle increases. Thus, when the laser is activated at regular intervals, the spot obtained on the photosensitive drum 28 are spaced closer in the central portion and wider in the edge portions of the drum. In order to prevent such phenomenon said imaging lens 27 is designed to have a characteristic $r = f \cdot \theta$, and such imaging lens is called an $f-\theta$ lens.

Also in case of focusing a parallel beam by an imaging lens into a spot, the minimum diameter $d_{min}$ thereof is given by:

$$d_{min} = f \lambda / A$$

wherein f is the focal length of the imaging lens, $\lambda$ is the wavelength of the beam and A is the entrance aperture of said imaging lens, so that the spot diameter can be reduced by increasing the aperture A for given values of f and $\lambda$. The aforementioned afocal lens system 24 is employed for this reason.

The laser beams modulated and deflected as explained in the foregoing are directed to the photosensitive drum 28 and converted by a known electrophotographic process into a visible image, which is then transferred onto plain paper and fixed thereon as a hard copy. As an example of the electrophotographic process applicable to the present embodiment, there is employed, as disclosed in the Japanese Patent Publication Sho 42-23910 assigned to the assignee of the present application, a photosensitive drum 28 essentially composed of a conductive substrate, a photoconductive layer and an insulating layer is at first surfacially charged uniformly with a positive or negative primary corona discharger 29 to capture the charge of a polarity opposite to said charging polarity at the interface between said photoconductive layer and insulating layer or in the photoconductive layer. Subsequently the surface of said charged insulating layer is exposed to the aforementioned laser beams simultaneously with an AC corona discharge or a corona discharge of a polarity opposite to that of said primary charging by a secondary corona discharger 30 to form a pattern of surface potential difference on said insulating layer corresponding to the intensity pattern of said laser beams, and is then illuminated uniformly by a flush exposure lamp 31 to form an electrostatic latent image of an elevated contrast on said insulating layer. Said latent image is rendered visible by a development with a developer principally composed of charged colored particles in a developing station 32, and the visible image thus obtained is transferred by a transfer charger 34 onto a fan-hold paper 33 (hereinafter referred to as transfer paper) maintained in contact with the photosensitive drum 28 by means to be explained later, and fixed thereon by fixing means to obtain an electrophotographic printed image. On the other hand, after said image transfer, the surface of said insulating layer is cleaned by a cleaning station 35 to remove the remaining charged particles, thereby preparing the photosensitive drum 28 for repeated use. In another example of the electrophotographic process, there is employed, as disclosed in the Japanese Patent Laid-Open Sho 42-19748 assigned to the assignee of the present application, a photosensitive drum essentially composed of a conductive substrate, a photoconductive layer and an insulating layer, which is at first surfacially charged uniformly with a positive or negative primary corona discharge to capture a charge of a polarity opposite to said charging polarity at the interface between said photoconductive layer and insulating layer or in the photoconductive layer. Subsequently said insulating layer is subjected to an AC corona discharge to attenuate the charge present on the surface of said insulating layer, and is then exposed to the aforementioned laser beams as information signals thereby forming an electrostatic latent image on said insulating layer corresponding to the intensity of said laser beams. The latent image thus formed is processed in the same manner as explained in the foregoing. In FIG. 8, 36 is a charger for preliminary charge elimination for maintaining the photosensitive drum 28 at a uniform and constant surface potential, while 37 is a pre-exposure lamp for realizing a uniform and constant characteristic in the photosensitive layer, whereby said means functioning in cooperation to eliminate various hystereses, such as retentive potential, remaining on the photosensitive drum 28 after passing the cleaning station 35 and thus to contribute to obtaining a stable image.

Also there has been proposed, in Japanese Patent Application Sho 51-111562, a process for stabilizing an electrostatic latent image for constantly obtaining a stable and satisfactory image in the electrophotographic processes applicable in the present embodiment. 38 is an electrostatic potential meter provided for conducting such stabilizing process and for measuring the electrostatic potentials of a dark area and a lighted area exposed to the laser beams on the photosensitive drum 28. Also 39 is a carrier eliminating device for preventing the carrier particles present in the developer in the developing station 32 from being carried over by the photosensitive drum 28 to the transfer paper or to the cleaning station 35.

33 is unprinted paper ordinarily used for computer output such as having perforations along the lateral edges thereof. For assisting the transportation of said paper there are provided a holding rod 40 for facilitating the smooth advancement of the paper, a light source 41 such as a light-emitting diode and a photodetector 42 such a photodiode which constitute a paper end detector, a known tractor 43 having pins engaging with said perforations and rotated by an unrepresented tractor shaft for transporting said paper, a paper guide roller 44, a separating claw 45 for separating from the photosensitive drum 28 said paper which is pressed against said drum by the transfer rollers 46, 47 and by a transfer charger 34 and remains in such contact state even after the function of said rollers and said transfer charger is terminated, and transfer rollers 46, 47 actuated simultaneously in a same direction to press said paper against the photosensitive drum 28.

Also there are provided a guide roller 48 also functioning to absorb an excessive tension eventually applied to the paper during the transportation thereof, a hollow preliminary heating roller 49 having a heater in the center thereof and a heating roller 50 for fixing the transferred toner particles and constituting the fixing station in combination with a back-up roller 51.

Said fixing roller 50 is of a hollow tubular shape and is provided with a heat source such as a heater in the center thereof, while said back-up roller 51 functions to press the paper having the toner particles thereon against said fixing roller 50 to facilitate the heat transmission therefrom to the toner particles and to the paper and to apply a high pressure to said toner particles. 52 and 53 are eject rollers for ejecting the paper 54 after said fixing step.

What is claimed is:

1. A high-speed scanning apparatus comprising:
   a laser for emitting a light beam of a wavelength $\lambda$;
   a modulator for converting the light beam from said laser into a plurality of independent modulated beams;
   a plane to be scanned by said plurality of beams from said modulator; and
   a converging optical system having a focal length f1 and positioned between said laser and said modulator, wherein the distance from the beam exit of said laser to said converging optical system is selected as $f1 + \Delta S$ while the distance from said converging optical system to the modulating point of said modulator is selected as substantially equal to f1, and $\Delta S$ is selected to satisfy the following relation:

$|\Delta S| < \pi \cdot Bi^2 / 4\lambda$ wherein Bi is the beam diameter.

2. A high-speed scanning apparatus according to the claim 1, wherein said $\Delta S$ is selected as zero and said converging optical system constitutes a telecentric system having the pupil at the beam exit of said laser.

3. A high-speed recording apparatus comprising:
   a laser for emitting a light beam having a wavelength $\lambda$ and a beam diameter Bi;
   a modulator for converting the light beam from said laser into a plurality of independent modulated beams;
   a deflector for deflecting the plurality of beams from said modulator in a predetermined direction;
   a photosensitive medium positioned to be scanned by said plurality of beams deflected by said deflector;
   a first converging lens system of focal length f positioned between said laser and said modulator; and
   a scanning imaging lens system positioned between said deflector and said photosensitive medium, wherein the distance from the beam exit of said laser to said first converging lens system is selected as $f + \Delta S$ while the distance from said first converging lens system to the modulating point of said modulator is being selected as substantially equal to f, and $\Delta S$ is selected to satisfy the following relation:

$|\Delta S| < \pi \cdot Bi^2 / 4\lambda$.

4. A high-speed rotating apparatus according to claim 3, wherein said photosensitive medium is a photosensitive drum essentially composed of a three-layered structure having a conductive substrate, a photoconductive layer and an insulating layer provided thereon in succession.

5. A high-speed recording apparatus according to claim 3, wherein said imaging lens system is provided with a distortion characteristic corresponding to the rotational characteristic of the deflector in order to achieve a constant-speed displacement of the light beams on said photosensitive medium.

* * * * *

UNITED STATES PATENT AND TRADEMARK OFFICE
CERTIFICATE OF CORRECTION

PATENT NO. : 4,312,588
DATED : January 26, 1982
INVENTOR(S) : KAZUO MINOURA, ET AL.

It is certified that error appears in the above—identified patent and that said Letters Patent is hereby corrected as shown below:

Column 1

Line 22, change "satifies" to --satisfies--.

Line 61, after "schematically", delete "there is".

Lines 61-62, after "wherein", insert --there is--.

Column 2 Equation (1)

"$\Delta\theta_o = Bi/Bo \times 66\theta_i$" should be --$\Delta\theta_o = Bi/Bo \times \Delta\theta_i$--.

Column 4

Line 46, change "emboyding" to --embodying--.

UNITED STATES PATENT AND TRADEMARK OFFICE
CERTIFICATE OF CORRECTION

PATENT NO. : 4,312,588

DATED : January 26, 1982

INVENTOR(S) : KAZUO MINOURA, ET AL.

It is certified that error appears in the above—identified patent and that said Letters Patent is hereby corrected as shown below:

Column 8

Line 18, delete "the" after "to".

Signed and Sealed this

Twenty-seventh Day of July 1982

[SEAL]

Attest:

Attesting Officer

GERALD J. MOSSINGHOFF

Commissioner of Patents and Trademarks